US012791469B2

(12) United States Patent
Kato

(10) Patent No.: US 12,791,469 B2
(45) Date of Patent: Nov. 10, 2026

(54) DETECTION DEVICE

(71) Applicant: Japan Display Inc., Tokyo (JP)

(72) Inventor: Hirofumi Kato, Tokyo (JP)

(73) Assignee: Japan Display Inc., Tokyo (JP)

( * ) Notice: Subject to any disclaimer, the term of this patent is extended or adjusted under 35 U.S.C. 154(b) by 30 days.

(21) Appl. No.: 19/046,017

(22) Filed: Feb. 5, 2025

(65) Prior Publication Data

US 2025/0180471 A1 Jun. 5, 2025

Related U.S. Application Data

(63) Continuation of application No. PCT/JP2023/027709, filed on Jul. 28, 2023.

(30) Foreign Application Priority Data

Aug. 8, 2022 (JP) ................................ 2022-126588

(51) Int. Cl.
*G01N 21/35* (2014.01)
*G01D 11/24* (2006.01)
*G01D 11/26* (2006.01)

(52) U.S. Cl.
CPC ........... *G01N 21/35* (2013.01); *G01D 11/245* (2013.01); *G01D 11/26* (2013.01); *G01N 2201/0221* (2013.01); *G01N 2201/0693* (2013.01)

(58) Field of Classification Search
CPC ........... G01N 21/35; G01N 2201/0221; G01N 2201/0693; G01D 11/245; G01D 11/26
See application file for complete search history.

(56) References Cited

U.S. PATENT DOCUMENTS 11,448,730 B2 * 9/2022 Etschmaier ............. G01S 7/497
2020/0151480 A1 5/2020 Min
2021/0287025 A1 9/2021 Min

FOREIGN PATENT DOCUMENTS

JP 2020-529695 A 10/2020

OTHER PUBLICATIONS

Search Report issued in International Patent Application No. PCT/JP2023/027709, mailed on Oct. 3, 2023 and English translation of same. 5 pages.

* cited by examiner

*Primary Examiner* — Georgia Y Epps
*Assistant Examiner* — Don J Williams
(74) *Attorney, Agent, or Firm* — K&L Gates LLP

(57) ABSTRACT

A detection device includes: a housing having a first surface with a light-shielding property and a second surface with a light-transmitting property; a light source provided inside a first area of the housing and configured to emit light from the second surface contacting a measurement target such that the light travels toward the measurement target; a first optical sensor provided inside the first area and capable of receiving light from the second surface; and a second optical sensor provided inside a second area different from the first area of the housing. The housing has an opening formed in the first surface of the second area and that allows light from an outside of the housing to pass therethrough to an inside of the housing. The second optical sensor configured to receive light from the opening and has a side that faces the second surface and is shielded from light.

12 Claims, 11 Drawing Sheets

DETECTION DEVICE

CROSS-REFERENCE TO RELATED APPLICATION

This application claims the benefit of priority from Japanese Patent Application No. 2022-126588 filed on Aug. 8, 2022 and International Patent Application No. PCT/JP2023/027709 filed on Jul. 28, 2023, the entire contents of which are incorporated herein by reference.

BACKGROUND

1. Technical Field

What is disclosed herein relates to a detection device.

2. Description of the Related Art

Detection devices that include a light source and a sensor have been developed in recent years to detect a vascular pattern of, for example, veins in a finger or a thumb, a wrist, or a leg. In a detection device of Japanese Translation of PCT International Application Publication Laid-open No. 2020-529695, the light source and the sensor are arranged so as to interpose an object to be detected therebetween. In such a detection device, light is emitted from the light source to the skin and enters the body. The light then passes through the blood, muscular tissues, and the like inside the body and further exits from the body to be received by the sensor.

For example, when measuring biometric information such as pulsation or a blood oxygen saturation level ($SpO_2$) using an optical sensor, if the optical sensor receives external light components in addition to light from a light source for measurement, the detection device may detect a wavelength different from a desired wavelength. For this reason, detection devices that use optical sensors are desired to reduce the effect of the external light.

SUMMARY

According to an aspect, a detection device includes: a housing having a first surface with a light-shielding property and a second surface with a light-transmitting property facing the first surface; a light source provided inside a first area of the housing and configured to emit light from the second surface contacting a measurement target such that the light travels toward the measurement target; a first optical sensor provided inside the first area of the housing and capable of receiving light from the second surface; and a second optical sensor provided inside a second area different from the first area of the housing. The housing has an opening formed in the first surface of the second area and that allows light from an outside of the housing to pass therethrough to an inside of the housing. The second optical sensor configured to receive light from the opening and has a side that faces the second surface and is shielded from light.

DETAILED DESCRIPTION

Figure 1:
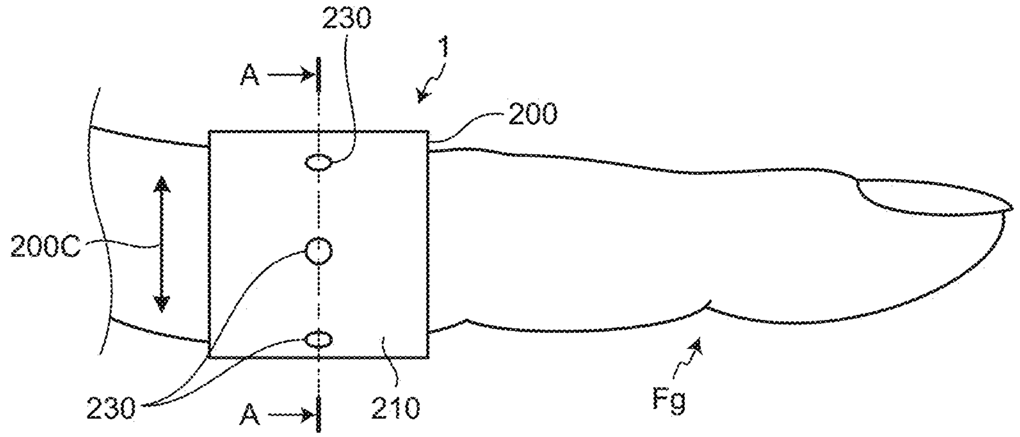
FIG. 1 is a schematic view illustrating an exemplary external view of a state where a finger is accommodated inside a detection device according to an embodiment of the present disclosure, as viewed from a lateral side of a housing.

The following describes a mode (embodiment) for carrying out the disclosure in detail with reference to the drawings. The present disclosure is not limited to the description of the embodiment to be given below. Components to be described below include those easily conceivable by those skilled in the art or those substantially identical thereto. In addition, the components to be described below can be combined as appropriate. What is disclosed herein is merely an example, and the present disclosure naturally encompasses appropriate modifications easily conceivable by those skilled in the art while maintaining the gist of the disclosure. To further clarify the description, the drawings may schematically illustrate, for example, widths, thicknesses, and shapes of various parts as compared with actual aspects thereof. However, they are merely examples, and interpretation of the present disclosure is not limited thereto. The same component as that described with reference to an already mentioned drawing is denoted by the same reference numeral through the present specification and the drawings, and detailed description thereof may not be repeated where appropriate.

In the present specification and claims, in expressing an aspect of disposing another structure on or above a certain structure, a case of simply expressing "on" includes both a case of disposing the other structure immediately on the certain structure so as to contact the certain structure and a case of disposing the other structure above the certain structure with still another structure interposed therebetween, unless otherwise specified.

EMBODIMENT

Detection Device

Figure 2:
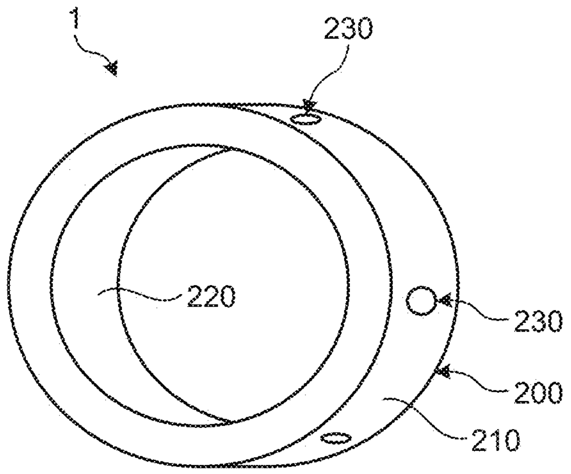
FIG. 2 is a perspective view of the detection device illustrated in FIG. 1 when not worn.
Figure 3:
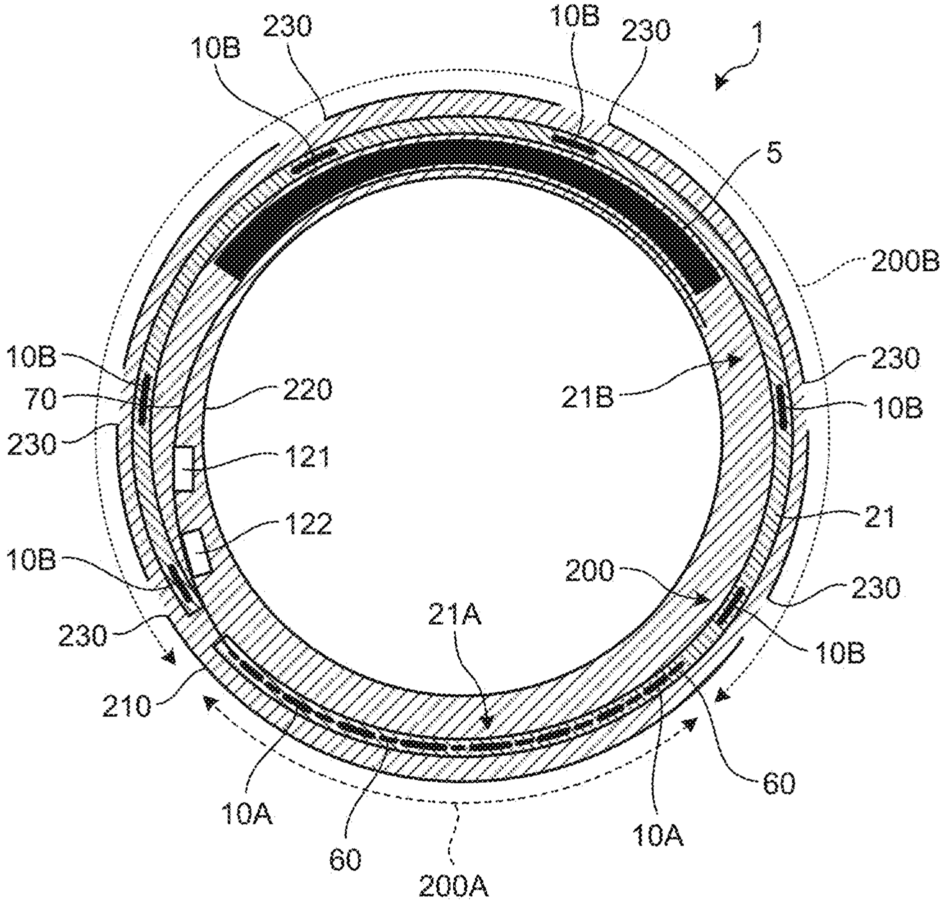
FIG. 3 is a schematic sectional view taken along section A-A illustrated in FIG. 1.
Figure 4:
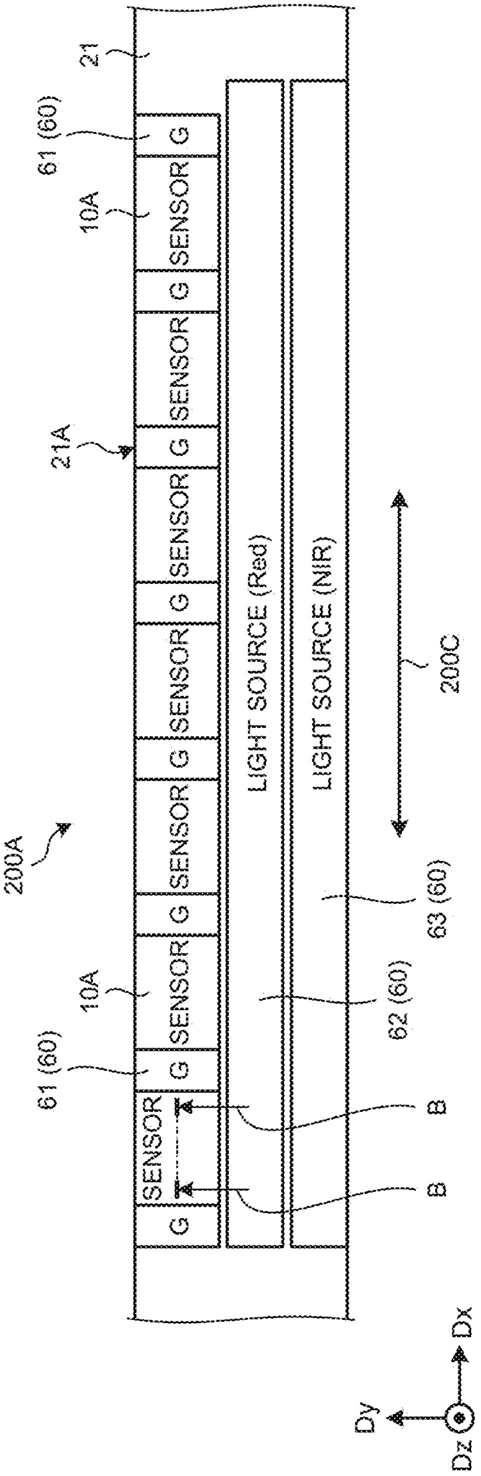
FIG. 4 is a schematic plan view illustrating an exemplary arrangement of first optical sensors and light sources illustrated in FIG. 3.
Figure 5:
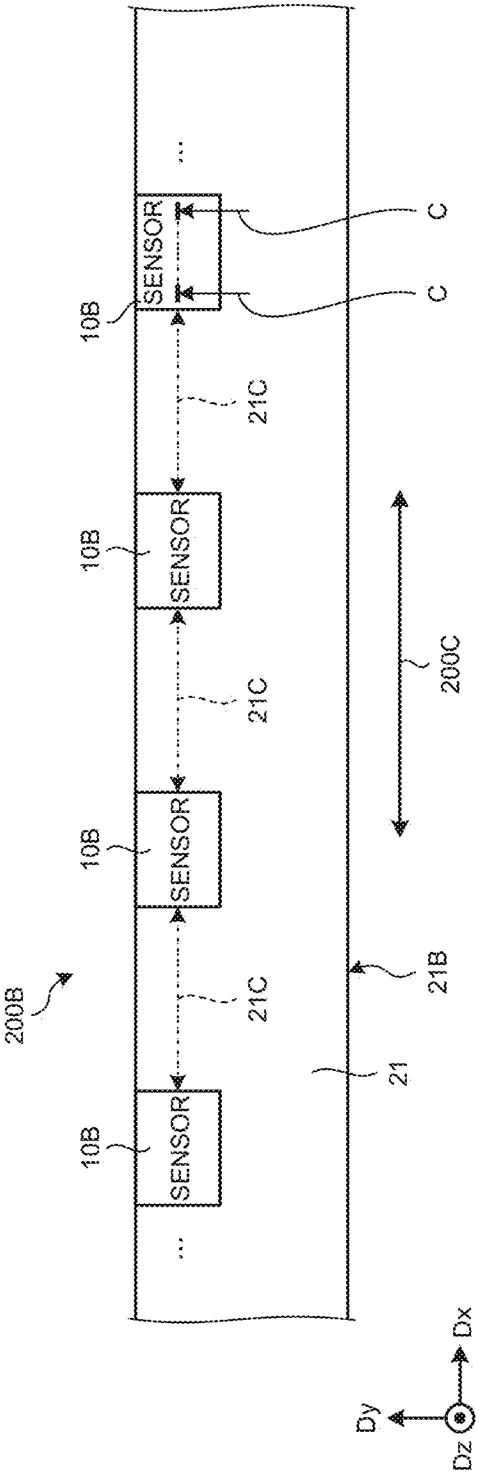
FIG. 5 is a schematic plan view illustrating an exemplary arrangement of second optical sensors illustrated in FIG. 3.

FIG. 1 is a schematic view illustrating an exemplary external view of a state where a finger is accommodated inside a detection device according to an embodiment of the present disclosure, as viewed from a lateral side of a housing. FIG. 2 is a perspective view of the detection device illustrated in FIG. 1 when not worn. FIG. 3 is a schematic sectional view taken along section A-A illustrated in FIG. 1. FIG. 4 is a schematic plan view illustrating an exemplary arrangement of first optical sensors and light sources illustrated in FIG. 3. FIG. 5 is a schematic plan view illustrating an exemplary arrangement of second optical sensors illustrated in FIG. 3. FIG. 3 illustrates only the basic configuration of the detection device according to the embodiment and does not illustrate the other configurations.

A detection device 1 illustrated in FIG. 1 is a finger ring-shaped device that can be worn on and removed from a human body. The detection device 1 is worn on a finger Fg of the human body. Examples of the finger Fg include a thumb, an index finger, a middle finger, a ring finger, and a little finger. The human body is a measurement target of the detection device 1. The detection device 1 can detect biometric information on a living body from the finger Fg with the detection device 1 worn. The finger Fg is an example of a measurement target. The measurement target is the living body or a part of the living body and is an object to be measured. The detection device 1 is shaped into a finger ring or a wristband so as to be easily carried by a user. In the following description, the detection device 1 is assumed to be used as a finger ring. The detection device 1 can use the detected biometric information for authentication of the person to be authenticated.

As illustrated in FIGS. 1 and 2, the detection device 1 includes a housing 200 formed into a ring shape using light-transmitting synthetic resin or silicon, for example. The housing 200 is a wearable member to be worn on the living body. The ring-shaped housing 200 has an inner circumference on the side in contact with the living body serving as the measurement target when worn and an outer circumference on the side opposite to the inner circumference. An outer circumferential surface 210 of the housing 200 is the surface of the outer circumference of the housing 200 and has a light-shielding property. The outer circumferential surface 210 is formed on the surface of the housing 200 by a light-shielding member, metal, or other material. The outer circumferential surface 210 prevents external light, such as sunlight and ambient light emitted from the outside of the housing 200, from entering the inside of the housing 200. An inner circumferential surface 220 of the housing 200 is the surface of the inner circumference of the housing 200 and has a light-transmitting property. The inner circumferential surface 220 outputs light from the inside of the housing 200 toward the center of the housing 200 and transmits light from the outside of the housing 200 to the inside. The outer circumferential surface 210 of the housing 200 is an example of a first surface according to the present embodiment, and the inner circumferential surface 220 is an example of a second surface. The outer circumferential surface 210 may include the side surfaces of the housing 200.

The housing 200 has a plurality of openings 230 formed in the outer circumferential surface 210 and that allows light from the outside of the housing 200 to pass therethrough to the inside of the housing 200. The openings 230 are formed in the outer circumferential surface 210 as holes, windows, or the like that let external light into the housing 200. As illustrated in FIG. 1, the openings 230 are formed in the outer circumferential surface 210 at predetermined intervals so as to be arranged along a circumferential direction 200C. In other words, the outer circumferential surface 210 can let external light into the housing 200 only from the openings 230. While the present embodiment describes a case where each of the openings 230 is formed as a single hole, it is not limited thereto. For example, the opening 230 may be formed as a set of holes or covered with a light-transmitting member.

As illustrated in FIG. 3, the detection device 1 includes the housing 200, light sources 60, first optical sensors 10A, and second optical sensors 10B. The detection device 1 is a device that includes a battery 5 in the housing 200 and is operated by power from the battery 5.

In the following description, a first direction Dx is one direction in a plane parallel to a sensor substrate 21 and is the same direction as the circumferential direction 200C. A second direction Dy is one direction in a plane parallel to the sensor substrate 21 and is a direction orthogonal to the first direction Dx. The second direction Dy may non-orthogonally intersect the first direction Dx. A third direction Dz is a direction orthogonal to the first direction Dx and the second direction Dy. The third direction Dz is a direction normal to the sensor substrate 21. The term "plan view" refers to a positional relation when viewed in a direction orthogonal to the sensor substrate 21.

The housing 200 accommodates therein the sensor substrate 21 on which the light sources 60, the first optical sensors 10A, the second optical sensors 10B, and other components are mounted, a flexible printed circuit board 70, and the battery 5. The housing 200 is formed in a ring shape, for example, by accommodating the sensor substrate 21 and the flexible printed circuit board 70 in a circular shape together with the battery 5 in a mold and filling the surrounding space with a transparent filling member.

The housing 200 has a first area 200A and a second area 200B. The first area 200A is an area for detecting biometric information from the living body in contact with or in proximity to the first area 200A. The second area 200B is an area for detecting external light. The first area 200A and the second area 200B are different areas in the housing 200. The first area 200A is an area where the ball of the finger Fg is positioned when the housing 200 is worn. The second area 200B includes an area facing the first area 200A in the housing 200. In other words, the detection device 1 is placed on the inner circumferential surface 220 such that the first area 200A is positioned on the ball side of the finger Fg and the second area 200B is positioned on a part different from the ball side of the finger Fg. The ball side of the finger Fg is the surface side of the finger Fg including the part having the fingerprint of the finger Fg. With this configuration, the detection device 1 can irradiate the openings 230 in the second area 200B of the housing 200 with external light, thereby improving the accuracy of detecting external light.

The housing 200 has the light-shielding outer circumferential surface 210 formed by integral formation, coating, vapor deposition, or other methods on the outer surface. In the housing 200, the openings 230 are not formed in the first area 200A and are formed at predetermined intervals along the circumferential direction 200C in the second area 200B. While the housing 200 has six openings 230 in the example illustrated in FIG. 3, the number is not limited thereto. While the opening 230 is formed as a hole, it may be formed into other shapes, such as a slit.

The sensor substrate 21 is an insulating substrate and is formed, for example, of a film-like light-transmitting resin into a band shape. The sensor substrate 21 is a deformable substrate on which the first and the second optical sensors 10A and 10B and the light sources 60 are mounted. The sensor substrate 21 is accommodated in the housing 200 in a state electrically coupled to the flexible printed circuit board 70. The sensor substrate 21 has an area 21A corresponding to the first area 200A of the housing 200 and an area 21B corresponding to the second area 200B of the housing 200. In the sensor substrate 21 according to the present embodiment, the first optical sensors 10A and the light sources 60 are mounted in the area 21A, and the second optical sensors 10B are mounted in the area 21B. The sensor substrate 21 is accommodated in the housing 200, whereby the light sources 60 are disposed inside the first area 200A of the housing 200 and are not disposed in the second area 200B.

As illustrated in FIG. 4, the sensor substrate 21 has the plurality of first optical sensors 10A mounted in a manner arranged along the circumferential direction 200C of the housing 200 in the area 21A. In the sensor substrate 21, the light sources 60 are disposed near the first optical sensors 10A.

The light sources 60 are provided inside the housing 200 and are configured to be capable of emitting light toward the center of the housing 200. The light sources 60 are provided inside the first area 200A of the housing 200 and can emit light such that the light exits from the inner circumferential surface 220 (second surface) contacting the finger Fg serving as the measurement target and travels toward the finger Fg. For example, an inorganic light-emitting diode (LED) or an organic electroluminescent (EL) diode (organic light-emitting diode (OLED)) is used as the light source 60. The light source 60 emits light having predetermined wavelengths. The light sources 60 according to the present embodiment include a first light source 61 that emits green light, a second light source 62 that emits red light, and a third light source that emits infrared light, specifically near-infrared light 63. The first light sources 61 are disposed between a plurality of adjacent first optical sensors 10A and are arranged along the circumferential direction 200C of the housing 200. In other words, the light sources 60 include a plurality of first light sources 61 disposed near the first optical sensors 10A to emit green light with a short wavelength. The second light source 62 is formed in a band shape extending along the first optical sensors 10A in the area 21A of the sensor substrate 21. The third light source 63 is formed in a band shape extending along the second light source 62 in the area 21A of the sensor substrate 21.

The light emitted from the light source 60 is reflected by a surface or other part of an object to be detected, such as the finger Fg, and enters the first optical sensor 10A. Thereby, the detection device 1 can detect a fingerprint by detecting a shape of asperities on the surface of the finger Fg or the like. Alternatively, the light emitted from the light source 60 may be reflected in the finger Fg or the like or transmitted through the finger Fg or the like and enter the first optical sensor 10A. Thereby, the detection device 1 can detect the information on the living body in the finger Fg or the like. Examples of the information on the living body include, but are not limited to, pulse waves, pulsation, and a vascular image of the finger or a palm. That is, the detection device 1 may be configured as a fingerprint detection device to detect a fingerprint or a vein detection device to detect a vascular pattern of, for example, veins.

The first optical sensor 10A detects light emitted by the light source 60 and reflected by the finger Fg or the like, light emitted by the light source 60 and directly incident on the first optical sensor 10A, and other light. In other words, the first optical sensor 10A can detect light from the inner circumferential surface 220 of the housing 200. The first optical sensor 10A can receive light from the outer circumferential surface 210 of the housing 200. The first optical sensor 10A is an organic photodiode (OPD). The first optical sensors 10A are disposed between the first light sources 61 in the circumferential direction 200C of the housing 200. In other words, in the sensor substrate 21, the first optical sensors 10A and the first light sources 61 are alternately disposed in the circumferential direction 200C of the housing 200. Each of the first optical sensors 10A is arranged adjacently to the second light source 62 and the third light source 63 in the second direction Dy.

As illustrated in FIG. 5, the sensor substrate 21 has a plurality of second optical sensors 10B mounted at predetermined intervals 21C in a manner arranged along the circumferential direction 200C of the housing 200 in the area 21B corresponding to the second area 200B of the housing 200. The predetermined interval 21C is longer than the interval between the first optical sensors 10A and is equal to the interval between the openings 230 in the housing 200. In other words, in the housing 200, the first optical sensors 10A are disposed at intervals different from intervals of the second optical sensors 10B.

The second optical sensor 10B detects external light passing through the opening 230 of the housing 200. The second optical sensor 10B is an organic photodiode. The second optical sensors 10B are formed in the circumferential direction 200C of the housing 200 and each have such a size that can receive external light passing through the opening 230 of the housing 200. The second optical sensor 10B includes a light-shielding layer for external light to prevent the received external light from being transmitted to the inside of the housing 200.

As illustrated in FIG. 3, the housing 200 accommodates the battery 5 in the second area 200B, and the second optical sensor 10B is disposed between the battery 5 and the outer circumferential surface 210. With this configuration, in the detection device 1, the battery 5 can prevent the external light received by the second optical sensor 10B from being transmitted to the inside of the housing 200. In this case, the second optical sensor 10B does not require the light-shielding layer for external light and has a simpler configuration.

Figure 6:
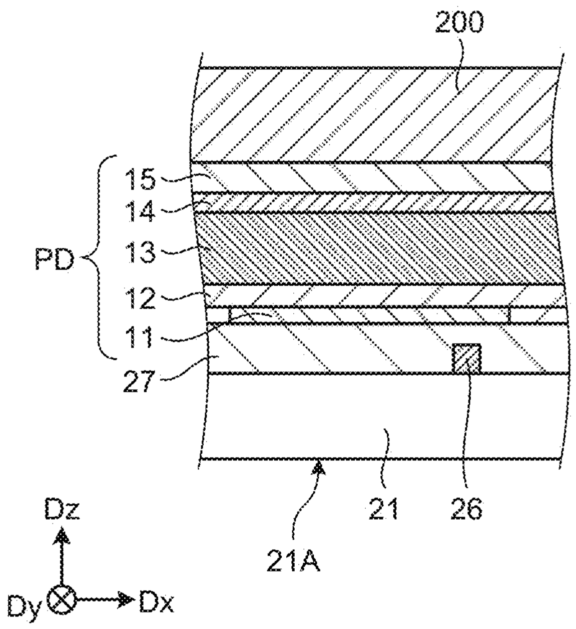
FIG. 6 is a schematic sectional view illustrating an exemplary multilayered configuration of the first optical sensor taken along section B-B illustrated in FIG. 4.
Figure 7:
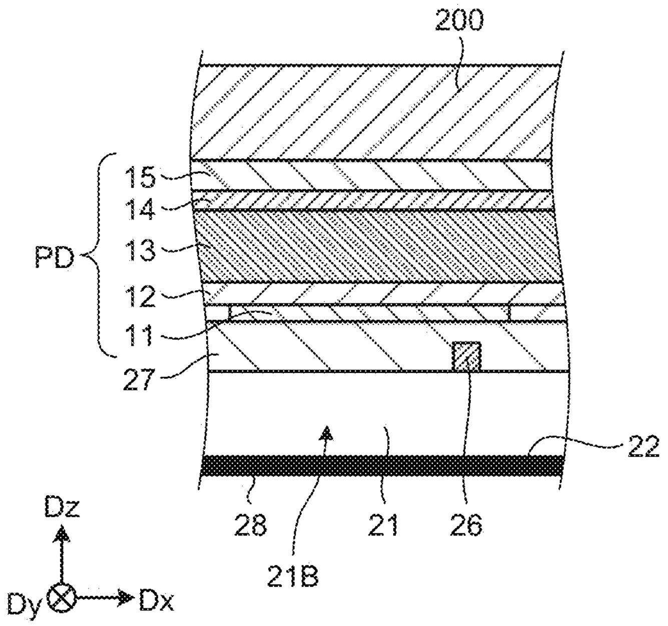
FIG. 7 is a schematic sectional view illustrating an exemplary multilayered configuration of the second optical sensor taken along section C-C illustrated in FIG. 5.

FIG. 6 is a schematic sectional view illustrating an exemplary multilayered configuration of the first optical sensor 10A taken along section B-B illustrated in FIG. 4. FIG. 7 is a schematic sectional view illustrating an exemplary multilayered configuration of the second optical sensor 10B taken along section C-C illustrated in FIG. 5.

As illustrated in FIG. 6, the first optical sensor 10A includes the sensor substrate 21 of the area 21A and a photodiode PD. In the present embodiment, the first optical sensor 10A further includes wiring 26 and an insulating layer 27. The insulating layer 27 is provided on the sensor substrate 21 so as to cover the wiring 26. The insulating layer 27 may be an inorganic insulating film or an organic insulating film. The wiring 26 may be formed in the same layer as a lower electrode 11.

The photodiode PD is provided on the insulating layer 27. The photodiode PD includes the lower electrode 11, a lower buffer layer 12, an active layer 13, an upper buffer layer 14, and an upper electrode 15. As the photodiode PD, the lower electrode 11, the lower buffer layer 12 (hole transport layer), the active layer 13, the upper buffer layer 14 (electron transport layer), and the upper electrode 15 are stacked in this order in the third direction Dz orthogonal to the sensor substrate 21.

The lower electrode 11 is an anode electrode of the photodiode PD and is formed of a light-transmitting conductive material such as indium tin oxide (ITO). The active layer 13 changes in characteristics (such as voltage-current characteristics and resistance value) according to light emitted thereto. An organic material is used as a material of the active layer 13. Specifically, the active layer 13 has a bulk heterostructure containing a mixture of a p-type organic semiconductor and an n-type fullerene derivative (PCBM) that is an n-type organic semiconductor. As the active layer 13, low-molecular-weight organic materials can be used including, for example, fullerene ($C_{60}$), phenyl-$C_{61}$-butyric acid methyl ester (PCBM), copper phthalocyanine (CuPc), fluorinated copper phthalocyanine ($F_{16}CuPc$), 5,6,11,12-tetraphenyltetracene (rubrene), and perylene diimide (PDI) (derivative of perylene).

The active layer 13 can be formed by a vapor deposition process (dry process) using any of the low-molecular-weight organic materials listed above. In this case, the active layer 13 may be, for example, a multilayered film of CuPc and $F_{16}CuPc$, or a multilayered film of rubrene and $C_{60}$. The active layer 13 can also be formed by a coating process (wet process). In this case, the active layer 13 is made using a material obtained by combining any of the above-listed low-molecular-weight organic materials with a high-molecular-weight organic material. As the high-molecular-weight organic material, for example, poly (3-hexylthiophene) (P3HT) and F8-alt-benzothiadiazole (F8BT) can be used. The active layer 13 can be a film made of a mixture of P3HT and PCBM, or a film made of a mixture of F8BT and PDI.

The lower buffer layer 12 is the hole transport layer. The upper buffer layer 14 is the electron transport layer. The lower buffer layer 12 and the upper buffer layer 14 are provided to facilitate holes and electrons generated in the active layer 13 to reach the lower electrode 11 or the upper electrode 15. The lower buffer layer 12 (hole transport layer) is in direct contact with the top of the lower electrode 11 and is also provided in an area between the adjacent lower electrodes 11. The active layer 13 is in direct contact with the top of the lower buffer layer 12. The material of the hole transport layer is a metal oxide layer. For example, tungsten oxide ($WO_3$) or molybdenum oxide is used as the oxide metal layer.

The upper buffer layer 14 (electron transport layer) is in direct contact with the top of the active layer 13, and the upper electrode 15 is in direct contact with the top of the upper buffer layer 14. Polyethylenimine ethoxylated (PEIE) is used as a material of the electron transport layer.

The materials and the manufacturing methods of the lower buffer layer 12, the active layer 13, and the upper buffer layer 14 are merely exemplary, and other materials and manufacturing methods may be used. For example, each of the lower buffer layer 12 and the upper buffer layer 14 is not limited to a single-layer film, and may be formed as a multilayered film that includes an electron blocking layer and a hole blocking layer.

The upper electrode 15 faces the lower electrode 11 with the lower buffer layer 12, the active layer 13, and the upper buffer layer 14 interposed therebetween. The upper electrode 15 is formed, for example, of a light-transmitting conductive material such as ITO or indium zinc oxide (IZO). The upper electrode 15 is electrically coupled to a power supply circuit, which is not illustrated. The photodiode PD is well sealed by providing the housing 200 on the upper electrode 15 and other components. While the present embodiment describes a case where the upper electrode 15 has a light-transmitting property, it is not limited thereto. For example, if the upper electrode 15 is formed by an Ag electrode or the like that does not transmit external light, a hole may be formed to allow external light to pass therethrough.

As illustrated in FIG. 7, the second optical sensor 10B includes the sensor substrate 21 of the area 21B, a photodiode PD, wiring 26, and an insulating layer 27. The second optical sensor 10B has the same basic configuration as the first optical sensor 10A does. The second optical sensor 10B further includes a light-shielding layer 28. In other words, the second optical sensor 10B has a configuration obtained by adding the light-shielding layer 28 to the configuration of the first optical sensor 10A.

The light-shielding layer 28 is provided on a surface 22 of the sensor substrate 21 opposite to the surface provided with the insulating layer 27. The light-shielding layer 28 is formed on the surface 22 of the sensor substrate 21 by a light-shielding member. The light-shielding layer 28 may be provided on the entire surface 22 of the sensor substrate 21 or only on part of the surface 22 facing the second optical sensor 10B.

As illustrated in FIG. 3, the flexible printed circuit board 70 is formed into a deformable band shape and is accommodated in the housing 200 in a manner bent in an arc shape. The flexible printed circuit board 70 is provided with various circuits, such as a detection circuit 121 and a control circuit 122, and electrically couples the various circuits to the battery 5. The flexible printed circuit board 70 is electrically coupled to the sensor substrate 21 and electrically couples the detection circuit 121 to the first optical sensors 10A, the second optical sensors 10B, and the light sources 60. The flexible printed circuit board 70 may be provided with other circuits, such as a communication circuit and a charging circuit.

The battery 5 is a secondary battery. The battery 5 is a chemical battery that can be repeatedly charged and discharged. Examples of the battery 5 include, but are not limited to, storage batteries, rechargeable batteries, etc. The battery 5 is in compliance with Qi (international standard for wireless power transfer), for example. The battery 5 can supply the stored power to each part or the like that requires power in the detection device 1. The battery 5 is electrically coupled to the light sources 60, the first optical sensors 10A, the second optical sensors 10B, and other components and can supply power to the light sources 60, the first optical sensors 10A, the second optical sensors 10B, and other components.

The detection circuit 121 controls the detection operation by supplying control signals to the photodiodes PD of the first optical sensors 10A and the second optical sensors 10B and detects information on the object to be detected based on detection signals from the photodiode PD for each of the first optical sensors 10A and the second optical sensors 10B. The detection circuit 121 includes an analog front-end (AFE) circuit, for example. The detection circuit 121 is a signal processing circuit having functions of at least a detection signal amplifier and an analog-to-digital (A/D) converter. The detection signal amplifier amplifies the detection signals. The A/D converter converts analog signals output from the detection signal amplifier into digital signals.

The control circuit 122 is electrically coupled to the detection circuit 121. The control circuit 122 performs a process based on the detection results of the detection circuit 121. The control circuit 122 can perform, for example, a process to calculate a blood oxygen saturation level ($SpO_2$) from a ratio in hemoglobin absorbance at wavelengths detected by the detection circuit 121. The blood oxygen saturation level ($SpO_2$) refers to a ratio of an amount of oxygen actually bound to hemoglobin to the total amount of oxygen under the assumption that the oxygen is bound to all the hemoglobin in the blood. The control circuit 122 can display the biometric information, including the blood oxygen saturation level and other information, on a display device or transmit it via a communication device. The control circuit 122 has a function to compare the information on the living body detected by the detection circuit 121 with authentication information stored in advance and authenticate the person to be authenticated based on the result of the comparison. The control circuit 122 has a function to control transmission of the information on the living body to an external device via a communication device, which is not illustrated.

The configuration example of the detection device 1 according to the present embodiment has been described above. The configuration described above using FIGS. 1 to 7 is merely an example, and the configuration of the detection device 1 according to the present embodiment is not limited to the example. The configuration of the detection device 1 according to the present embodiment can be flexibly modified according to specifications and/or operations.

When external light is incident on the housing 200 of the detection device 1, most part of the light is blocked by the outer circumferential surface 210, but the other part is transmitted to the inside of the housing 200 through the openings 230. In the detection device 1, the second optical sensor 10B receives external light from the opening 230 of the housing 200 but can prevent the external light from passing through the inside of the housing 200 and traveling toward the finger Fg. In the detection device 1, when the light source 60 emits light toward the finger Fg in contact with or in proximity to the inner circumferential surface 220 of the housing 200, the first optical sensor 10A receives light reflected by the finger Fg, light transmitted through the finger Fg, light directly incident on the first optical sensor 10A, and other light. For example, when the ring-shaped detection device 1 is worn on the finger Fg and is irradiated with external light, such as ambient light and sunlight, the external light incident on the finger Fg may possibly be transmitted through or reflected by the finger Fg and reach the first optical sensor 10A. The detection device 1, however, can reduce the amount of external light included in the light received by the first optical sensor 10A because the first optical sensor 10A detects the light from the measurement target and the second optical sensor 10B detects the external light. As a result, the detection device 1 can reduce the effect of external light when making measurements using the optical sensors.

In the detection device 1, the light sources 60 are not disposed in the second area 200B of the housing 200. This configuration can reduce the effect of external light when making measurements using the optical sensors without increasing the number of light sources 60. Therefore, the detection device 1 can reduce the effect of external light when making measurements using the optical sensors without increasing the cost.

In the detection device 1, the second optical sensors 10B are disposed at the predetermined intervals 21C in the second area 200B of the housing 200. With this configuration, the second optical sensors 10B can detect external light in a wide area of the housing 200. Therefore, the detection device 1 can suppress reduction in the accuracy of detecting external light if the posture of the housing 200 changes.

In the detection device 1, the first optical sensors 10A are disposed in the housing 200 at intervals different from the intervals of the second optical sensors 10B. This configuration requires a smaller number of the second optical sensors 10B to be accommodated in the housing 200. Therefore, the detection device 1 can suppress an increase in the number of the second optical sensors 10B and suppress reduction in the accuracy of detecting external light if the posture of the housing 200 changes.

Figure 8:
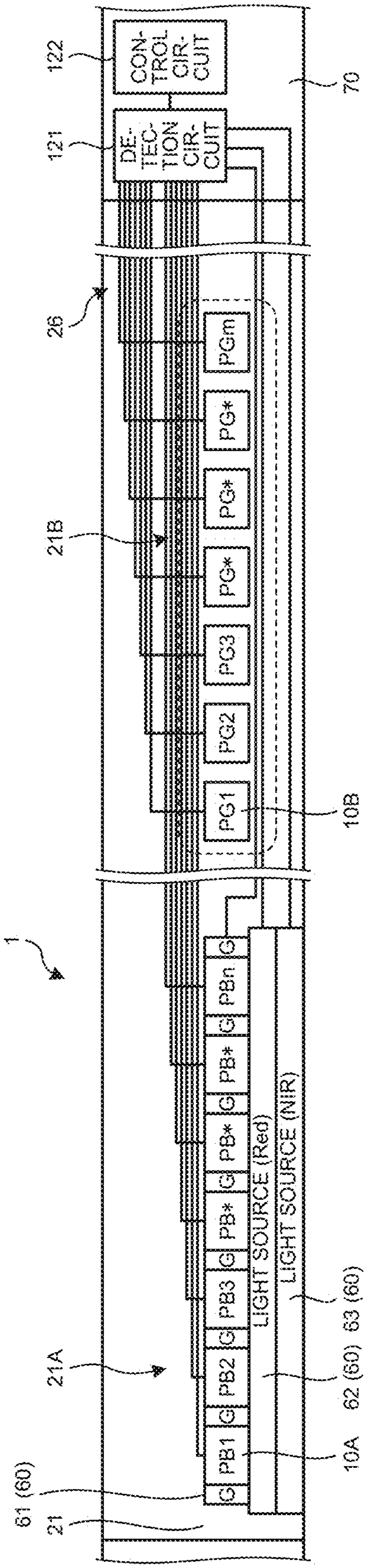
FIG. 8 is a schematic view for explaining an example of removal of external light by the detection device according to the embodiment.

FIG. 8 is a schematic view for explaining an example of removal of external light by the detection device 1 according to the embodiment. In FIG. 8, the interval between the second optical sensors 10B is reduced. In the example illustrated in FIG. 8, the detection circuit 121 is electrically coupled to the light sources 60, the first optical sensors 10A, and the second optical sensors 10B by the wiring 26 in the detection device 1. The detection circuit 121 detects outputs of n first optical sensors 10A in the area 21A of the sensor substrate 21 corresponding to the first area 200A of the housing 200 as sensor outputs PB1, PB2, PB3, . . . and PBn, where n is an integer. The detection circuit 121 detects outputs of m second optical sensors 10B in the area 21B of the sensor substrate 21 corresponding to the second area 200B of the housing 200 as sensor outputs PG1, PG2, PG3, . . . and PGm, where m is an integer.

The detection circuit 121 substitutes the sensor outputs into the following Expression (1): $Pout=(PB1+PB2+\ldots+PBn)/n-\alpha*\{(PG1+PG2+\ldots+PGm)/m\}$ and detects the calculated Pout as vital data. $\alpha$ is a coefficient equal to or smaller than 1. The coefficient $\alpha$ is a fixed value independent of external light intensity. Thus, the detection circuit 121 subtracts the average value of a plurality of pieces of the external light data from the average value of a plurality of pieces of the vital data, thereby detecting vital data from which the external light has been removed.

In the case of ambient light, for example, the pulse waves detected by the conventional detection device may possibly include commercial frequency or inverter frequency noise included in the light source of the ambient light. Alternatively, the pulse waves detected by the conventional detection device may possibly include DC components due to sunlight. By contrast, the detection device 1 according to the embodiment has the second optical sensors 10B that can detect external light separately from the first optical sensors 10A and can eliminate the effect of external light by subtracting the DC components due to the external light from the vital data. As a result, the detection device 1 can reduce the effect of external light when making measurements using the optical sensors.

The detection circuit 121 may subtract the average value of the outputs of the external light sensors from the vital data of a specific element. For example, if a pulse wave AC component of the n-th first optical sensor 10A is the largest, the n-th first optical sensor 10A is determined to be the specific element. In this case, the detection circuit 121 substitutes the sensor outputs into the following Expression (2): $Pout=PBn-\alpha*\{(PG1+PG2+\ldots+PGm)/m\}$ and detects the calculated Pout as vital data. Thus, the detection circuit 121 can detect vital data from which the external light has been removed as in the case where Expression (1) is used.

The detection circuit 121 may subtract the output of the external light sensor from the vital data of one specific element. For example, if the pulse wave AC component of the n-th first optical sensor 10A is the largest and the DC component of the m-th second optical sensor 10B is the largest, the n-th first optical sensor 10A and the m-th second optical sensor 10B are determined to be the specific element. In this case, the detection circuit 121 substitutes the sensor outputs into the following Expression (3): $Pout=PBn-\alpha*PGm$ and detects the calculated Pout as vital data. Thus, the detection circuit 121 can detect vital data from which the external light has been removed as in the case where Expressions (1) and (2) are used.

Figure 9:
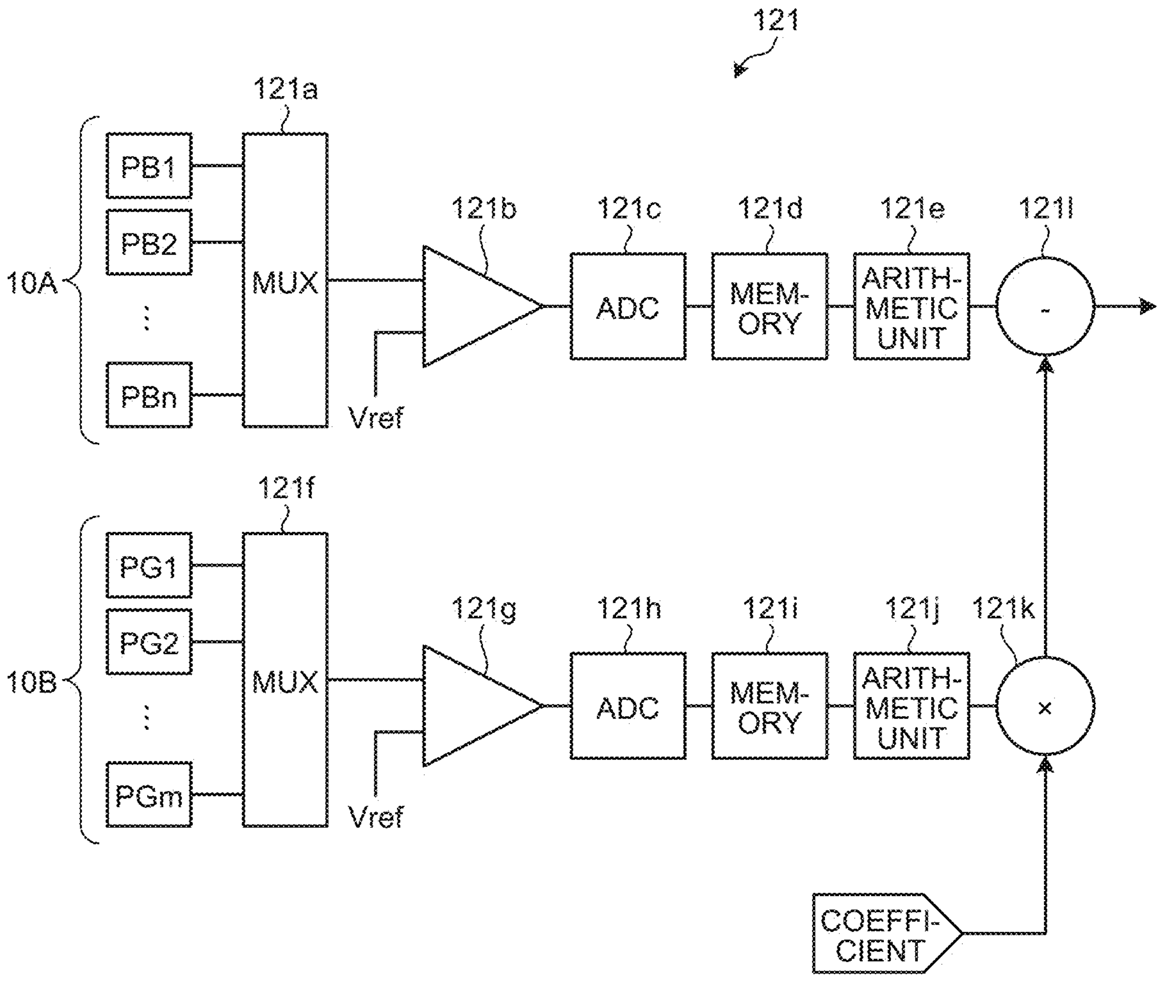
FIG. 9 is a block diagram illustrating an example of a circuit configuration of a detection circuit illustrated in FIG. 8.

FIG. 9 is a block diagram illustrating an example of a circuit configuration of the detection circuit 121 illustrated in FIG. 8. As illustrated in FIG. 9, in the detection circuit 121, a multiplexer 121*a* is electrically coupled to the plurality of first optical sensors 10A, and signals received by the multiplexer 121*a* are transmitted to an A/D converter 121*c* via an operational amplifier 121*b*. The detection circuit 121 stores the vital data converted from analog signals into digital signals by the A/D converter 121*c*, in a memory 121*d* for each of the first optical sensors 10A. When the detection circuit 121 stores therein the values of the vital data of all the first optical sensors 10A, it calculates the average value of the values of these vital data by an arithmetic unit (arithmetic circuit) 121*e* and outputs the calculation result to a subtractor 121*l*.

In the detection circuit 121, a multiplexer 121*f* is electrically coupled to a plurality of second optical sensors 10B, and signals received by the multiplexer 121*f* are transmitted to an A/D converter 121*h* via an operational amplifier 121*g*. The detection circuit 121 stores the external light data converted from analog signals into digital signals by the A/D converter 121*h*, in a memory 121*i* for each of the second optical sensors 10B. When the detection circuit 121 stores therein the values of the external light data of all the second optical sensors 10B, the detection circuit 121 calculates the average value of the values of these external light data by an arithmetic unit (arithmetic circuit) 121*j*, multiplies the average value by the coefficient α by a multiplier 121*k*, and outputs the calculation result to the subtractor 121*l*.

In the detection circuit 121, the subtractor 121*l* subtracts the value obtained from the multiplier 121*k* from the average value of the vital data, thereby detecting the vital data calculated using Expression (1), wherein the value obtained from the multiplier 121*k* is a value obtained by multiplying the average value of the plurality of pieces of external light data by the coefficient α, as described above. The detection circuit 121 adjusts the vital data detected by the first optical sensors 10A based on the external light data detected by the second optical sensors 10B and supplies the vital data to the control circuit 122. Thus, the detection circuit 121 can supply the vital data less affected by the external light.

Figure 10:
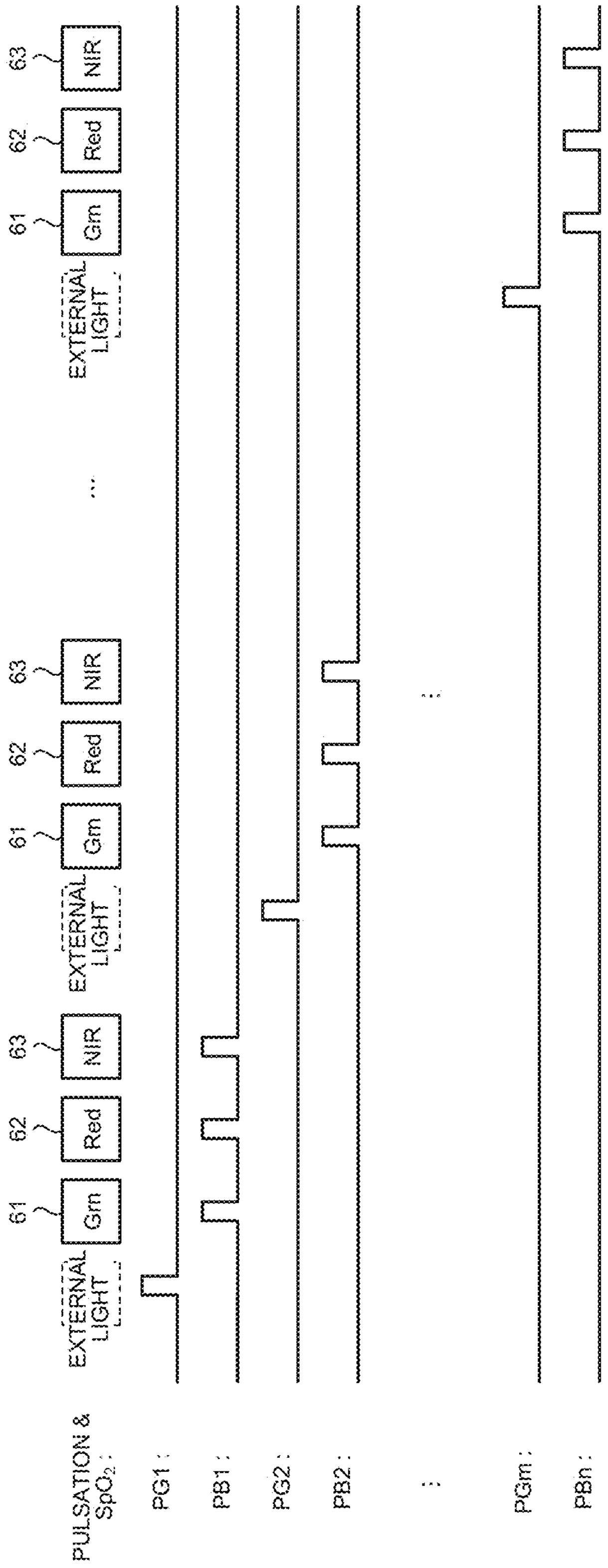
FIG. 10 is a timing chart illustrating an example of detection by the detection circuit illustrated in FIG. 9.

FIG. 10 is a timing chart illustrating an example of detection by the detection circuit 121 illustrated in FIG. 9. FIG. 10 illustrates an example where the detection device 1 detects vital data for detecting pulse waves and a blood oxygen saturation level ($SpO_2$). As illustrated in FIG. 10, the detection device 1 detects the sensor output PG1 from the second optical sensor 10B without turning on the light source 60. The detection device 1 turns on the first light source 61 to emit green light from the first light source 61 and detects the sensor output PB1 from the first optical sensor 10A. Subsequently, the detection device 1 turns on the second light source 62 to emit red light from the second light source 62 and detects the sensor output PB1 from the first optical sensor 10A. Subsequently, the detection device 1 turns on the third light source 63 to emit near-infrared light from the third light source 63 and detects the sensor output PB1 from the first optical sensor 10A. The detection circuit 121 performs control such that the difference between the detection timing of the first optical sensor 10A and that of the second optical sensor 10B is equal to or shorter than 100 μs. With this configuration, the detection circuit 121 can reduce the time difference between the vital data detection and the external light detection. As a result, the detection circuit 121 can eliminate the effect of external light during detection from the vital data, thereby improving the accuracy of the vital data.

The detection circuit 121 may perform control such that the difference between the detection timing of the first optical sensor 10A and that of the second optical sensor 10B is equal to or shorter than 10 μs. With this configuration, the detection circuit 121 can further reduce the time difference between the vital data detection and the external light detection if the finger Fg or the like wearing the detection device 1 moves or the ambient environment changes. As a result, the detection circuit 121 can more accurately eliminate the effect of external light during detection from the vital data, thereby improving the accuracy of the vital data.

After the detection device 1 detects the three sensor outputs PB1 corresponding to green light, red light, and near-infrared light, the detection device 1 sequentially turns on the three light sources 60 in the same manner to detect the sensor outputs PB2, . . . , and PBn of the first optical sensors 10A and the sensor outputs PG2, . . . , and PGm of the second optical sensors 10B. The detection device 1 detects the vital data by substituting the detection results into Expression (1) described above for each of the green light, the red light, and the near-infrared light and supplies the detection results to the control circuit 122.

The control circuit 122 detects the pulsation based on the vital data obtained when the first light source 61 is turned on. The control circuit 122 detects the blood oxygen saturation level based on the vital data obtained when the second light source 62 is turned on and the vital data obtained when the third light source 63 is turned on. The control circuit 122 can provide the biometric information, such as the detected pulsation and the detected blood oxygen saturation level.

While the detection circuit 121 detects the pulsation and the blood oxygen saturation level in the example illustrated in FIG. 10, the present embodiment is not limited thereto. For example, when detecting only the pulsation, the detection circuit 121 simply needs to turn on the first light source 61 to detect green light by the first optical sensor 10A after detecting external light by the second optical sensor 10B. For example, when detecting only the blood oxygen saturation level, the detection circuit 121 simply needs to sequentially turn on the second light source 62 and the third light source 63 to detect red light and near-infrared light by the first optical sensor 10A after detecting external light by the second optical sensor 10B.

Figure 11:
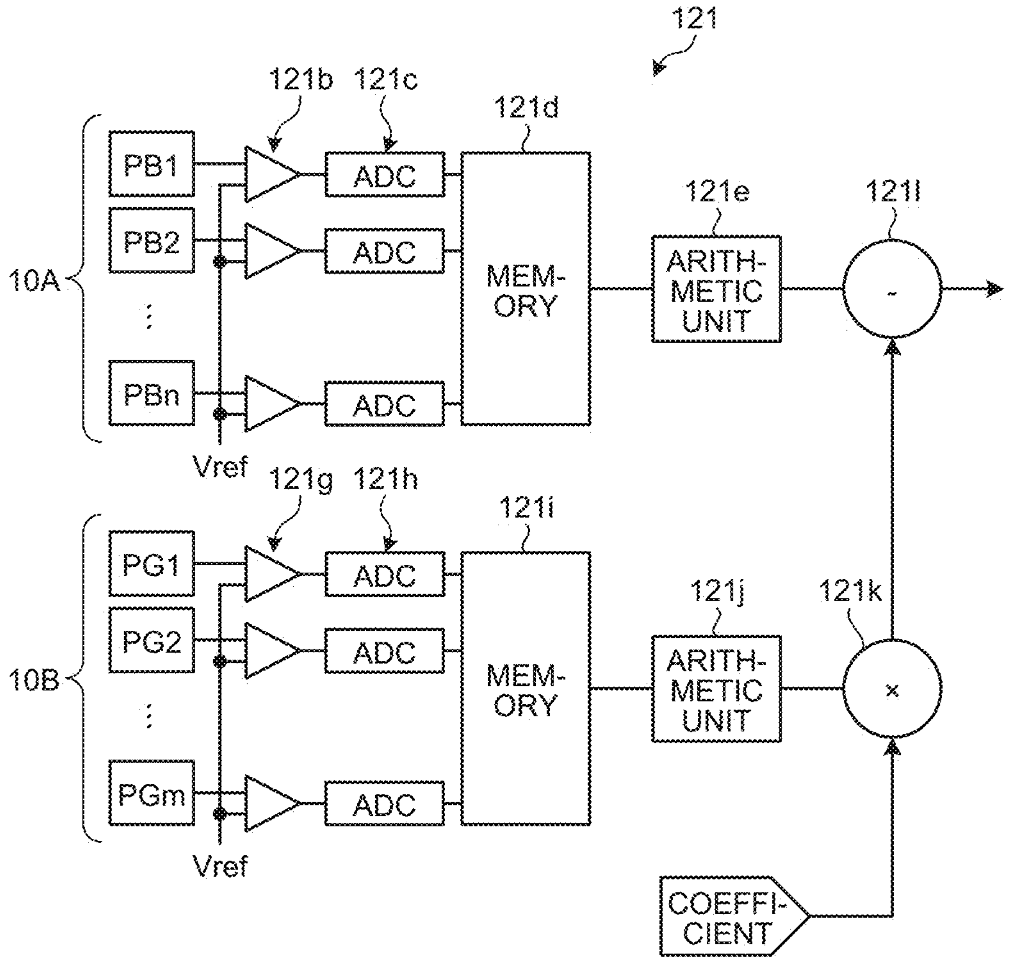
FIG. 11 is a block diagram illustrating another example of the circuit configuration of the detection circuit illustrated in FIG. 8.

FIG. 11 is a block diagram illustrating another example of the circuit configuration of the detection circuit 121 illustrated in FIG. 8. As illustrated in FIG. 11, in the detection circuit 121, the plurality of first optical sensors 10A are electrically coupled to a plurality of operational amplifiers 121*b* in one-to-one correspondence. In the detection circuit 121, signals received from the respective first optical sensors 10A are each transmitted to the A/D converter 121*c* via the operational amplifier 121*b*. The plurality of pieces of vital data converted from analog signals into digital signals by the A/D converter 121*c* are collectively stored in the memory 121*d* of the detection circuit 121 for each of the first optical sensors 10A. When the detection circuit 121 stores therein the plurality of pieces of vital data of all the first optical sensors 10A, the detection circuit 121 calculates the average value of the plurality of pieces of vital data by the arithmetic unit 121*e* and outputs the calculation result to the subtractor 121*l*. With this configuration, the detection circuit 121 can store the plurality of pieces of vital data from the first optical sensors 10A collectively in the memory 121*d*, thereby reducing the processing time.

In the detection circuit 121, the plurality of second optical sensors 10B are electrically coupled to a plurality of operational amplifiers 121*g* in one-to-one correspondence. In the detection circuit 121, signals received from the respective second optical sensors 10B are each transmitted to the A/D converter 121*h* via the operational amplifier 121*g*. The plurality of pieces of external light data converted from analog signals into digital signals by the A/D converter 121*h* are collectively stored in the memory 121*i* of the detection circuit 121 for each of the second optical sensors 10B. When the detection circuit 121 stores therein the plurality of pieces of external light data of all the second optical sensors 10B, the detection circuit 121 multiplies the average value of the plurality of pieces of external light data by the coefficient α with the multiplier 121*k* and outputs the calculation result to the subtractor 121*l*.

In the detection circuit 121, the subtractor 121*l* subtracts the value obtained from the multiplier 121*k* from the average value of the plurality of pieces of vital data, thereby detecting the vital data calculated using Expression (1), wherein the value obtained from the multiplier 121*k* is a value obtained by multiplying the average value of the plurality of pieces of the external light data by the coefficient α. The detection circuit 121 supplies the calculated vital data to the control circuit 122.

Figure 12:
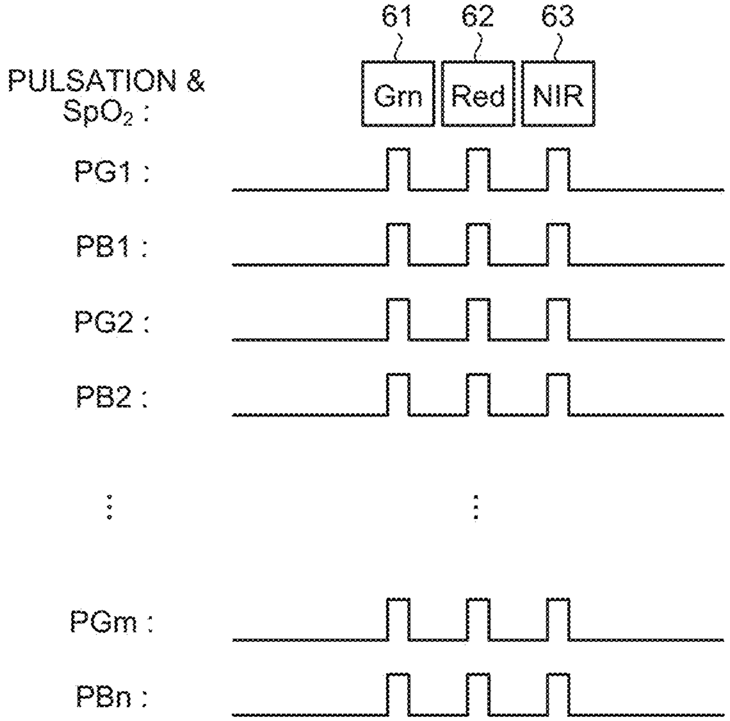
FIG. 12 is a timing chart illustrating an example of detection by the detection circuit illustrated in FIG. 11.

FIG. 12 is a timing chart illustrating an example of detection by the detection circuit 121 illustrated in FIG. 11. FIG. 12 illustrates an example of a case where the detection device 1 detects vital data for detecting pulse waves and a blood oxygen saturation level ($SpO_2$). As illustrated in FIG. 12, the detection device 1 turns on the first light source 61 to emit green light from the first light source 61. Thus, the detection device 1 detects the sensor outputs PB1 to PBn from the first optical sensors 10A and the sensor outputs PG1 to PGm from the second optical sensors 10B. In the detection circuit 121, the difference between the detection timing of the first optical sensor 10A and that of the second optical sensor 10B may be equal to or shorter than 100 μs or equal to or shorter than 10 μs. Subsequently, the detection device 1 turns on the second light source 62 to emit red light from the second light source 62. Thus, the detection device 1 detects the sensor outputs PB1 to PBn from the first optical sensors 10A and the sensor outputs PG1 to PGm from the second optical sensors 10B. Subsequently, the detection device 1 turns on the third light source 63 to emit near-infrared light from the third light source 63. Thus, the detection device 1 detects the sensor outputs PB1 to PBn from the first optical sensors 10A and the sensor outputs PG1 to PGm from the second optical sensors 10B. The detection device 1 detects the vital data for each of the green light, the red light, and the near-infrared light by substituting the detection results into Expression (1) described above and supplies the detection results to the control circuit 122. Therefore, the detection device 1 can ensure that the ambient environment detected by the first optical sensors 10A is the same, thereby further improving the detection accuracy.

Figure 13:
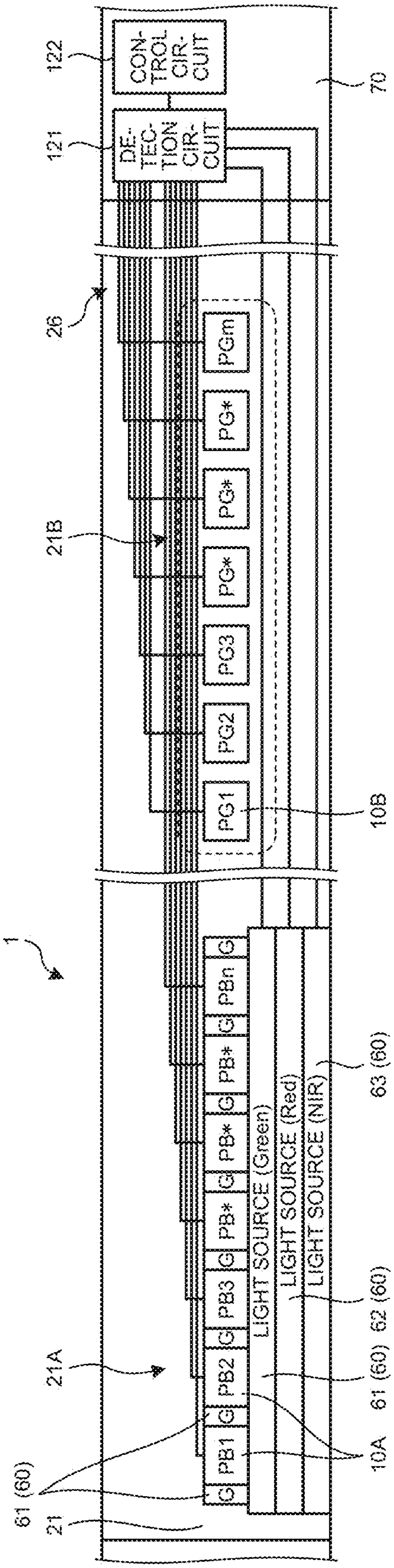
FIG. 13 is a schematic view for explaining a modification of a first light source of the detection device according to the embodiment.

FIG. 13 is a schematic view for explaining a modification of the first light source of the detection device 1 according to the embodiment. In FIG. 13, the interval between the second optical sensors 10B is reduced as in FIG. 8. In the example illustrated in FIG. 13, the light source 60 of the detection device 1 includes the first light source 61, the second light source 62, and the third light source 63. The first light sources 61 are disposed between a plurality of adjacent first optical sensors 10A and between the first optical sensors 10A and the second light source 62. The first light source 61 is formed in a band shape extending along the first optical sensors 10A in the area 21A of the sensor substrate 21. The second light source 62 is formed in a band shape extending along the first optical sensors 10A and the first light source 61 in the area 21A of the sensor substrate 21. The third light source 63 is formed in a band shape extending along the second light source 62 in the area 21A of the sensor substrate 21. With this configuration, the detection device 1 can detect green light with a shorter wavelength by the first optical sensors 10A, thereby improving the accuracy of the pulsation based on the detection results.

While the detection device 1 according to the embodiment described above is configured such that the first area 200A and the second area 200B do not overlap each other in the housing 200, the present embodiment is not limited thereto. For example, the detection device 1 may be configured such that the first area 200A and the second area 200B overlap each other.

While the detection device 1 according to the embodiment described above has the openings 230 in the second area 200B of the housing 200, the present embodiment is not limited thereto. For example, the detection device 1 may accommodate the battery 5 in an area of the housing 200 facing the first area 200A and have the openings 230 only in the area.

The components in the embodiment described above can be combined as appropriate. Other operational advantages accruing from the aspects described in the embodiments of the present disclosure that are obvious from the description herein, or that are conceivable as appropriate by those skilled in the art will naturally be understood as accruing from the present disclosure.

What is claimed is:

1. A detection device comprising:

a housing having a first surface with a light-shielding property and a second surface with a light-transmitting property facing the first surface;

a light source provided inside a first area of the housing and configured to emit light from the second surface contacting a measurement target such that the light travels toward the measurement target;

a first optical sensor provided inside the first area of the housing and capable of receiving light from the second surface; and a second optical sensor provided inside a second area different from the first area of the housing, wherein the housing has an opening formed in the first surface of the second area and that allows light from an outside of the housing to pass therethrough to an inside of the housing, and the second optical sensor configured to receive light from the opening and has a side that faces the second surface and is shielded from light.

2. The detection device according to claim 1, wherein the housing does not have the light source inside the second area.

3. The detection device according to claim 2, wherein the second area of the housing has a plurality of the second optical sensors disposed at predetermined intervals.

4. The detection device according to claim 3, wherein the housing has a plurality of the first optical sensors are disposed at intervals different from intervals of the second optical sensors.

5. The detection device according to claim 4, wherein the housing accommodates a battery in the second area, and the second optical sensor is disposed between the battery and the first surface.

6. The detection device according to claim 5, wherein
the housing is formed in a ring shape, and
the second area includes an area facing the first area in the housing.

7. The detection device according to claim 6, wherein the light source is configured to emit any one of infrared light, red light, and green light.

8. The detection device according to claim 7, wherein the first optical sensor is capable of receiving light from the first surface and the second surface of the housing.

9. The detection device according to claim 8, wherein the first optical sensor and the second optical sensor are each an organic photodiode comprising a sensor substrate, a lower electrode, a lower buffer layer, an active layer, an upper buffer layer, and an upper electrode.

10. The detection device according to claim 1, further comprising a detection circuit configured to adjust a detection value detected by the first optical sensor based on a detection value detected by the second optical sensor.

11. The detection device according to claim 10, wherein the difference between a detection timing of the first optical sensor and a detection timing of the second optical sensor is equal to or shorter than 100 μs.

12. The detection device according to claim 10, wherein the difference between a detection timing of the first optical sensor and a detection timing of the second optical sensor is equal to or shorter than 10 μs.

* * * * *